May 25, 1965 F. SCHNEIDER 3,184,941
APPARATUS FOR FASTENING A BUSHING IN AN
EYE-HOLE OF A WAGON TONGUE
Original Filed March 14, 1960
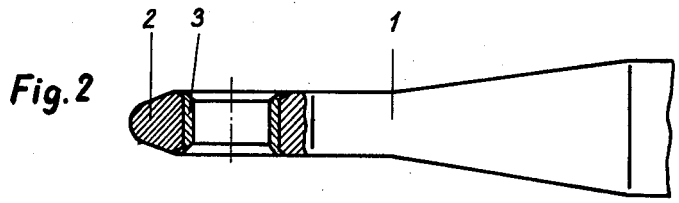
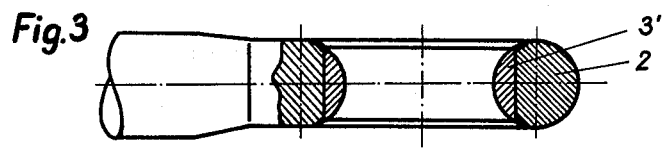
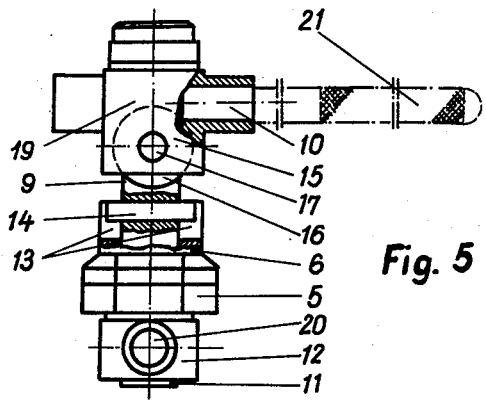
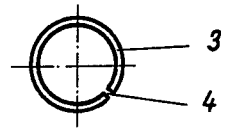
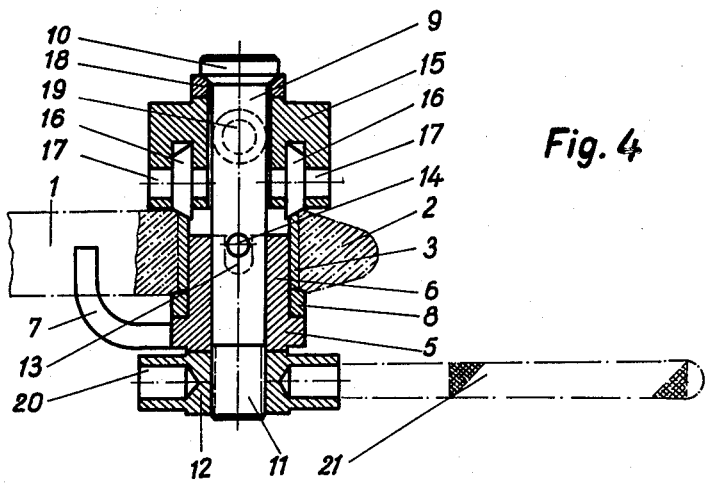
INVENTOR.
Friedrich Schneider
BY Ernest G Montague
Attorney

United States Patent Office 3,184,941
Patented May 25, 1965

3,184,941
APPARATUS FOR FASTENING A BUSHING IN AN EYE-HOLE OF A WAGON TONGUE
Friedrich Schneider, Werderstrasse 8, Heidelberg, Germany
Original application Mar. 14, 1960, Ser. No. 14,732. Divided and this application Jan. 22, 1962, Ser. No. 167,717
1 Claim. (Cl. 72—126)

This application is a division of copending patent application, Serial No. 14,732, filed March 14, 1960, now abandoned.

The present invention relates to an apparatus for fastening the bushing inserted in the eye-hole bore of a wagon tongue or the like.

To eliminate wear of the eye-hole bore, it has already been proposed to fasten wear-resistant, slotted spring steel bushings in the eye-hole bore by beading the bushings' rims in order to avoid welding operations and heat treatment.

Tools to flange or bead steam pipes are already known. Such tools consist substantially of a shaft, the lower end of which is provided with a number of slotted plates and flexible rings of an outer diameter corresponding to the diameter of the steam pipe to be flanged.

After the tool has been inserted into the steam pipe, the set of slotted plates and flexible rings can be spread, by means of a tapered screw guided on the shaft, so that the shaft is centered in the steam pipe. With the aid of ratchet wheels and pawls a number of grooved rollers is operated to flange or beadover the upper rim of the steam pipe by continuously applying pressure.

Such tools, however, are unsuitable to fasten a spring steel bushing in an eyehole bore. They can only be used to flange comparatively thin-walled pipes, and on the other hand, they cannot apply the pressure necessary to flange slotted spring steel bushings, because it is not possible to secure the tool with its set of slotted plates and flexible rings in the bushing.

It is one object of the present invention to provide an apparatus for fastening a bushing in the bore of a wagon tongue by means of a tool which flanges the bushing in an eyehole bore of a wagon tongue and is of a very simple construction.

It is another object of the present invention to provide an apparatus for fastening a bushing in the bore of a wagon tongue, wherein a guide with a shaft sliding therein is inserted into the bore from one side and secured against rotation. The shaft is provided with a freely rotatable support having pressure rollers and bearing against a thrust block or an enlarged part of the shaft. On a threaded part of the shaft which extends beyond the guide, an adjusting device is provided to axially press the support with its rollers against the rim of the bushing. The support and the adjusting device are provided with projections, or bores, or the like to receive a handle, a fork, a bolt, or the like which fits into both parts.

Conveniently, the bushing is first flanged at its one end, whereupon the tool is inserted into the other side of the bushing so that the beading operation can now be carried out on the opposite side.

With these and other objects in view, which will become apparent in the following detailed description, the present invention will be clearly understood in connection with the accompanying drawing, in which:

FIGURE 1 is a top plan view of a slotted, cylindrical spring steel bushing;

FIG. 2 is an axial section of a bushing having an eye-hole bore, the bushing being flanged;

FIG. 3 is an axial section of a bushing having an eye-hole bore, disclosing a different embodiment of the flange; and FIGS. 4 and 5 are elevations, partly in section, of the flanging tool in different operating positions.

Referring now to the drawing, a wagon tongue 1, a trailer drawbar, a run-over brake, or the like usually ends in a ring-shaped eye-hole 2. In its bore, a wear-resistant spring steel bushing 3 or 3' respectively, is fastened, having a slot 4 and pressing against the walls of the bore due to its internal stress. The tool to flange the bushing, substantially consists of a guide 5, a cylindrical shaft 6 therein to rest against the inside of the steel bushing 3, and an abutment 7 which rests against the side of the eye-hole to secure the guide 5 against rotation. The guide 5 is supported on the rim of the bushing 3 by means of a tapered ring 8.

A shaft 9 having an enlarged part 10 is inserted into the guide 5 at its upper end. At its lower end, the shaft 9 has a threaded part 11 to receive an adjusting nut 12. In its cylindrical shaft 6, the guide 5 is provided with a slot 13, which receives a safety bolt 14 extending through the shaft 9.

A support 15 is freely rotatable on the shaft 9 above the bushing 3, and provided with freely rotatable tapered pressure rollers 16 on shafts 17. The support 15 rests on the head 10 of the shaft 9 by means of a ball socket 18.

The support 15, as well as the adjusting nut 12, are provided with bores 19 and 20, respectively, to receive a handle 21 and 21', respectively.

The operation of the tool takes place in the following manner:

After the pre-stressed bushing 3 has been driven into the bore of the eye-hole 2, the tool is applied. First, the guide 5 is inserted into the bushing 3 from one side. Then, the shaft 9 with a roller support 15 is inserted from the other side of the bushing and the adjusting nut 12 screwed on the threaded part 11 of the shaft 9 against the guide 5 from the one side of the housing. The safety bolt 14 slips thereby into the slot 13. The tapered rollers 16 rest on the rim of the bushing 3. After fitting the lever 21 into the bore 19 or 20, the roller support can be rotated about the shaft 19 and the adjusting nut 12 can be readjusted. Thus, the rim of the bushing 3 is gradually flanged into a position shown in FIG. 2. In the same manner, the bushing 3' is flanged.

After the flanging operation is finished at one side, the tool is disassembled and re-inserted into the bushing from the opposite side. The flanging operation is then repeated on the opposite side of the bushing 3 in the manner as described above. In this way, the bushing is tightly fitted and at the same time safely secured against rotation. It is impossible for the bushing 3 to fall out of the eye-hole 2.

While I have disclosed one embodiment of the present invention, it is to be understood that this embodiment is given by example only and not in a limiting sense, the scope of the present invention being determined by the objects and the claim.

I claim:

An apparatus for fastening a bushing in an eye-hole of a wagon tongue comprising
 a hollow guide disposed in and engaging the inner face of a bushing to be fastened,
 means securing said guide against rotation,
 a tapered ring mounted on said guide and engaging one end face of said bushing,
 a shaft having a head portion extending through said guide from the side opposite said tapered ring and having at the end disposed adjacent said tapered ring a threaded portion,
 an adjusting nut threadedly secured to said threaded portion of said shaft,
 said guide having at its end disposed in said bushing an axial slot extending from its inner face,
 said shaft having a safety bolt projecting radially from its outer surface and received in said axial slot of said guide, thus permitting
a relative axial movement between said shaft and said bushing, yet also preventing a rotating movement of said shaft,
a support rotatably mounted on said shaft between said head portion and said wagon tongue,
a plurality of shafts disposed radially relative to said shaft and mounted in said support,
a pressure roller secured to and rotatable with each of said shafts and engaging one side of said bushing, and
means for turning said support about said shaft simultaneously rotating said pressure rollers, so that one edge portion of said bushing is secured to said eyehole of said wagon tongue.

References Cited by the Examiner
UNITED STATES PATENTS

| | | | |
|---|---|---|---|
| 213,321 | 3/79 | Bushor | 153—81 |
| 429,263 | 6/90 | Edwards | 151—81 |
| 897,175 | 8/08 | Tassey | 153—81 |
| 929,706 | 8/09 | Pfluger et al. | 153—81 |
| 1,234,680 | 7/17 | Lowy | 153—81 |

CHARLES W. LANHAM, *Primary Examiner.*